March 17, 1970

C. DAVIS 3,501,007

DRAINAGE WELL

Filed Nov. 13, 1968

INVENTOR.
CLOYD DAVIS

BY

ATTORNEY

United States Patent Office 3,501,007
Patented Mar. 17, 1970

3,501,007
DRAINAGE WELL
Cloyd Davis, Williston Park, N.Y., assignor to Modern Sewerage Systems, Inc., Roslyn, N.Y., a corporation of New York
Continuation-in-part of application Ser. No. 709,416, Feb. 29, 1968. This application Nov. 13, 1968, Ser. No. 775,451
Int. Cl. E02b *13/00;* B01d *21/10*
U.S. Cl. 210—170         7 Claims

ABSTRACT OF THE DISCLOSURE

A drainage well having a plurality of enclosure members forming a tank chamber, each formed with a plurality of circumferential openings affording fluid exiting ports on spaced levels.

THE PRIOR ART

This is a continuation-in-part of copending application Ser. No. 709,416, filed Feb. 29, 1968, now U.S. Patent No. 3,451,553 and claim is hereby made for all the legal and equitable benefits which may be derived therefrom.

The present invention relates to a novel apparatus for draining water and, in particular, to a dry well.

Dry wells for the drainage of household or industrial waste water (normally exclusive of raw organic sewage) are quite common and generally comprise some form of a hole or tank structure placed within the earth and which is then packed with several layers of gravel and sand. The well is constructed of water-tight materials, such as concrete, wood and steel provided with holes or escape ports along the bottom. The water is retained in the well until it seeps through the gravel and sand and exits from the escape ports. During the period of seepage, of course, particulate matter carried by the water is filtered out by the gravel and sand so that the effluent water enters the surrounding earth relatively pure.

Dry wells, as commonly known, are rather expensive to construct and operate particularly since they are an adjunct and addition to the septic tank system or other means for treating organic sewage. The dry well structure must be specifically designed to fit the site, placed into the earth and the outside is back filled with sand and gravel. They are normally overly large for ordinary use so as to accommodate the periodic great in-rushes of water caused by cyclical uses of such appliances as washers and bathtubs. Furthermore, within a relatively short period of time, they become clogged and full of the particulate filtrate and gravel and sand must be fully removed and replaced.

SUMMARY AND OBJECTS OF THE INVENTION

It is an object of the present invention to provide a dry well which is both inexpensive to construct and maintain.

It is an object of the present invention to provide a dry well, the structure of which is made up essentially of ring-shaped block-like members which afford a substantial economy and ease in fabrication assembly.

It is further object of this invention to provide a dry well in which exit areas are relatively large so that flow rates are substantially increased, thus permitting the use of smaller dimensioned structures.

It is still another object of this invention to provide a dry well which is easily cleanable and quickly restored to proper functioning after being clogged.

Briefly, the present invention provides a dry well constructed of a plurality of ring-like blocks, one stacked upon another, in tiered fashion and set in a base and surrounding environment of gravel. Each of the ring-like blocks are provided with escape ports filled with sand or other filter media forming effluent filter discharge points at a plurality of levels.

The aforementioned objects and advantages, as well as others not heretofore mentioned, will be apparent from the full description of an embodiment of the present invention set forth hereinafter. The description is made in conjunction with the appended drawings in which:

DETAILED DESCRIPTION OF THE PREFERRED EMBODIMENT

Figure 1:
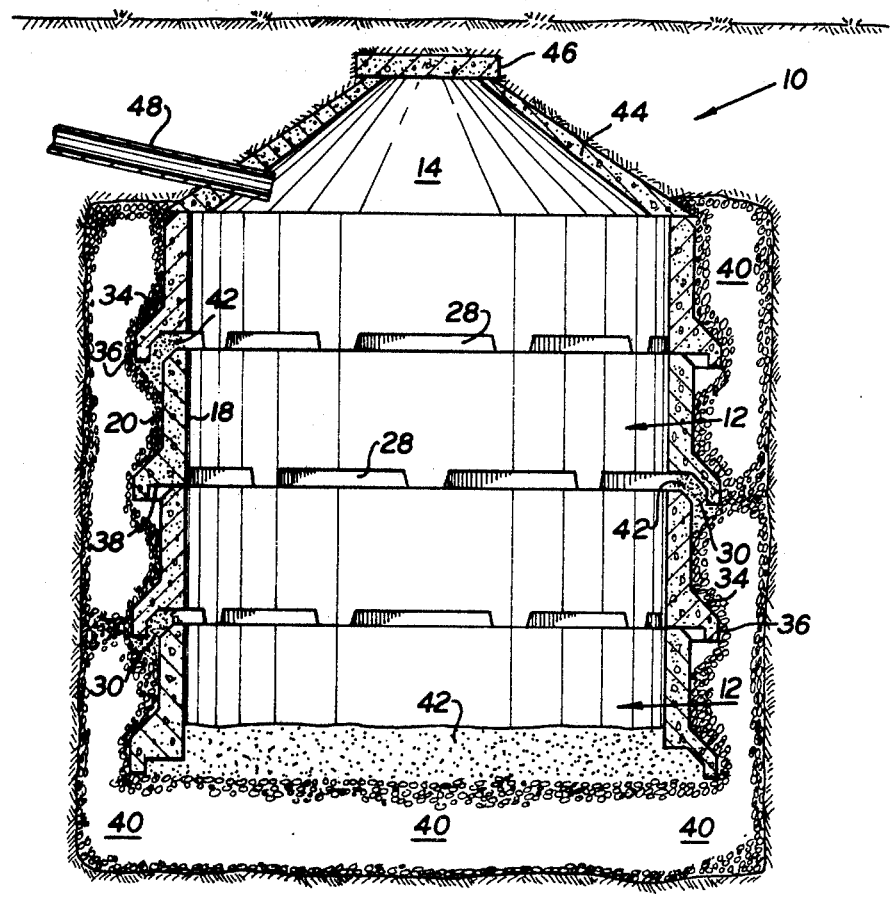
FIG. 1 is a vertical elevational cross sectional view of a dry well made in accordance with the present invention.
Figure 2:
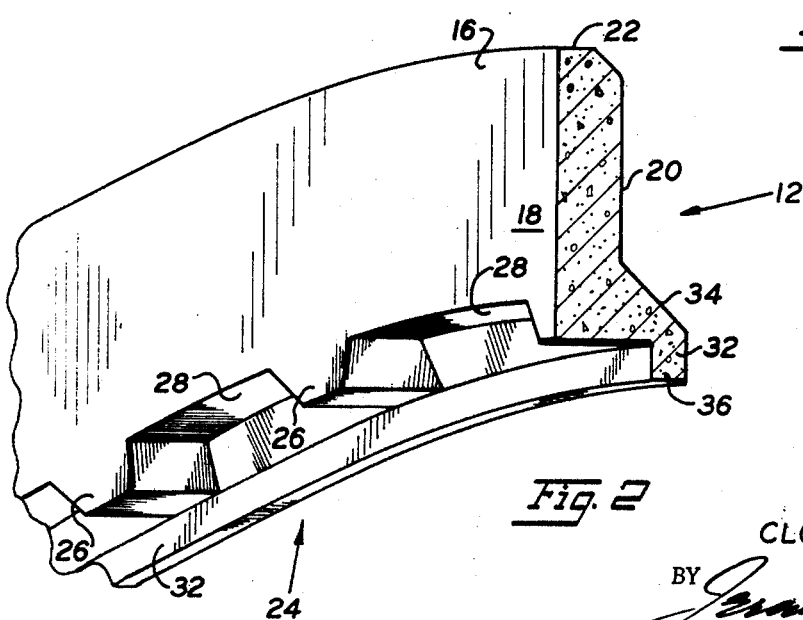
FIG. 2 is a fragmentary view of a ring-block member showing the detail of its construction.

The dry well comprises a tank assemblage generally identified by numeral 10 formed of a plurality of enclosure members generally identified by numeral 12 stacked one atop another forming a substantial hollow chamber 14. Each of the circular enclosures 12 comprises a ring band 16 having substantially smooth inner and outer surfaces 18 and 20, respectively, and a smooth continuous uniplanar upper edge 22. The bottom generally identified by numeral 24 of each circular enclosure is provided with uniform alternating legs 26 and openings 28. The feet or underside of legs 26 are smooth and uniplanar so as to seat squarely on the upper edge 22 of the next lower tier 12. The openings 28 are arch-like and extend arcuately about the circumference of the tier to provide a plurality of peripheral outlets 30. While it has been shown that the openings 28 and legs 26 are uniform and evenly spaced, it will be noted that this is not essential and that any arrangement of legs and openings may be effected without substantial change in operation.

Each ring 16 is further provided with an annular peripheral lip 32 having an angular outer portion 34 extending laterally outwardly and a terminal portion 36 extending downwardly and outwardly spaced from and substantially parallel to the outer surface 20 of the ring 16. The circumferential lip 32 covers the openings 28 completely preventing entry of material from the surrounding environment backward into the enclosed chamber 14. A connecting member 38 joins the circumferential lip 32 to each of the feet 26 adjacent the lower edge 24 to provide strength and to separate the adjacent peripheral outlets 28.

The enclosure tiers 12 are assembled to form the chamer 14 by first placing the lowermost tier 12 upon a substantial bed of stone and gravel 40 and then partially filling the same with a layer of sand 42 or other filter media. The layer of sand need be no greater than one foot in depth. A succession of tiers 12 are then stacked, in alignment, one atop the other until a chamber 14 of desired depth is obtained, having a plurality of fluid outlets 30 at a plurality of vertically spaced tiers.

After the tiers 12 are set into place, the outside of the assembly is back-filled with stone and gravel 40, thereby creating a substantial supporting wall and closure about the structure and through which the effluent may dissipate. Each of the peripheral outlets 30, closed at the outside by the fill 40, are tightly packed on the inside with sand 42 or other filter media as desired. In place of sand any other fine filter media may be employed, while in place of stone or gravel or other coarse filter media, which is also of sufficient structural supporting strength, must be substituted.

In packing the outlets 32 with filter media 42 on the inside, it will be recognized that the media 42 is packed into pockets. These are formed on the bottom by the upper edge 22 of the next lower tier 12 beneath the openings 28, into the outlets 30, closed at their outsides by the fill 40 and at the sides by the legs 26. The fill 42 thus effectively closes the openings 28 and outlets 30 to cooperate with the outside fill 40 to complete the inside and outside filtering media.

The structure is completed by placing over the topmost ring a cover comprising a truncated cone 44 and a cap 46 of concrete similar to that shown in the aforementioned application. An inlet conduit means 48 for the inflow of fluid is directed into the dry well 10 by extending through any one of a plurality of knock-out plugs (not shown) which may be provided about the truncated cone 44.

It will be obvious that various details concerning the construction and arrangement of parts are similar to those shown in the aforementioned copending application. For the sake of brevity, such details are not repeated here. However, the disclosures contained in the aforesaid application are incorporated herein by reference as if more fully set forth.

In operation, fluid entering the chamber 14 will be retained therein for a period of time exiting only by seepage through the outlets 30. Before exiting, however, the particulate matter contained in the fluid will be filtered out by the packed sand filter media 42 in the bottom of the chamber 14 and in each of the openings and outlets 30.

The flow rate of the present structure is substantially increased over that in structures now in common use since fluid exits not only by seepage at the bottom of the chamber but by seepage laterally of the chamber at each level or tier of the structure. Since the retention time of the fluid in the chamber is reduced, the structure may be smaller in overall size than would be commonly used and yet be sufficient to accommodate the periodic influx of large quantities of fluid.

By the present construction, flow rate is also enhanced since advantage is taken of the hydrostatic head or pressure created by the column of fluid retained within the chamber. Thus, as the column rises the flow through all of the outlets 30 increases proportionately. Consequently, since the fluid exiting ports 30 are on vertically spaced tiers, flow is not dependent solely on gravity but upon the pressure exerted by the level of fluid within the enclosure.

Backwash of fluid from the surrounding earth is avoided by the particular construction of the lip overlying the outlets 30, which, coupled with the hydrostatic head, maintains consistent outward seepage about the full circumference of each tier. Because of this, the outlets 30 may be relatively large by present standards, also increasing flow rates.

Another advantage in the present structure lies in the fact that only a rather shallow layer of sand is placed within the base of the well and that the well is not, as in the prior art, completely filled with sand and gravel.

Should the outlets 30 or a substantial number of them eventually become clogged, so as to reduce the rate of flow or effectiveness of the structure, it is an easy matter to set it in proper condition. The outlets 30 can be simply backwashed to remove its packed sand 42, which together with the bottom layer of sand, is removed. The openings 28 and outlets 30 and bottom ring are then repacked with clean sand 42 and the structure is ready for use. No gravel need be removed and the ring structure need not be disturbed. The amount of sand which is removed is small by comparison to the amounts now used in similarly functioning structures.

It will, however, be apparent that the invention disclosed herein provides an improved dry well and drainage system which has increased capacity, more effective and less expensive than heretofore known. The structure may under some circumstances be employed as a septic tank although this is not recommended since it does not really provide ample dwell time within the chamber for the total digestion of all the organic wastes. It is also possible to use one or more of the present tier structures with the tier structure of the aforementioned application, to form a novelly combined septic tank and dry well with the advantage of both also combined.

As noted, various modifications present themselves as being obvious. For example, the height of each ring 12 is a matter of choice and while circular enclosure members have been shown and are preferred, they may, as will be easily conceived, oval or even polygonal in form. The exact shape is not critical provided, however, that the band structure form, at least in complete assembly, be an enclosure forming an interior chamber. Each enclosure member is preferably cast as a single concrete unit, however, metal or plastic may be substituted for the concrete.

Accordingly, the present description is illustrative only and it is intended that this invention be limited solely by the appended claims.

What is claimed is:

1. A drainage well system comprising a plurality of endless ring-shaped vertically stacked enclosure members forming a substantially hollow chamber, each of said members comprising a band provided with a plurality of openings positioned circumferentially along its lower edge forming a plurality of peripheral exhaust ports, each of said exhaust ports being packed with a fine filter media whereby seepage and filtration is accomplished on the level of each of said enclosure members, each of said bands is provided with covering means for each of said exhaust ports for preventing the reverse flow of fluid into said chamber from outside of said chamber, and said covering means comprising a flared lip spaced outward of and extending downward to the lower edge of said band and circumferentially thereabout.

2. The system according to claim 1 wherein said enclosure members are surrounded with a wall of coarse filter media providing natural drainage away from said chamber and support therefor.

3. The system according to claim 2 wherein said lowermost member is supported on a bed of said coarse filter media and is provided internally with a layer of said fine filter media.

4. The system according to claim 3 wherein said fine filter media is sand and said coarse filter media is stone and gravel.

5. In a drainage well a structural member for burial within the earth comprising an annular hollow ring for receiving contaminated fluid, said ring having a plurality of legs circumferentially along its bottom edge alternating with openings for radial flow of fluid, and an integral circumferential lip extending angularly outwardly of said band and downwardly spaced from said openings to cover the same, the fluid received within said ring and said lip combining to provide for radially outward flow of fluid and to prevent radially inward flow of fluid from the surrounding environment.

6. In a drainage well having a plurality of members according to claim 5, said members each being stacked one upon the other whereby each of said members provides radial outlet openings for fluid flow, the rate of flow of fluid through the openings of each level being dependent upon the level of fluid within the entire well.

7. In a drainage well according to claim 6, the outlet openings being provided with a filter media whereby particles within the fluid may be captured.

References Cited

UNITED STATES PATENTS

| | | | |
|---|---|---|---|
| 931,032 | 8/1909 | Bussman | 210—170 |
| 1,155,970 | 10/1915 | Terry | 210—170 |
| 1,695,443 | 12/1928 | Studley | 210—532 X |
| 2,069,058 | 1/1937 | Davis | 210—532 X |
| 2,767,801 | 10/1956 | Eads | 61—11 X |

JACOB SHAPIRO, Primary Examiner

U.S. Cl. X.R.

61—11; 210—207, 532